US 6,629,203 B1

(12) United States Patent
Humlicek

(10) Patent No.: US 6,629,203 B1
(45) Date of Patent: Sep. 30, 2003

(54) ALTERNATING SHADOW DIRECTORIES IN PAIRS OF STORAGE SPACES FOR DATA STORAGE

(75) Inventor: Donald R. Humlicek, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 233 days.

(21) Appl. No.: 09/755,458

(22) Filed: Jan. 5, 2001

(51) Int. Cl.[7] .............................................. G06F 12/00
(52) U.S. Cl. ........................................ 711/114; 711/154
(58) Field of Search ................................. 711/114, 165, 711/144, 205, 203, 154; 707/204, 203; 714/2, 6

(56) References Cited

U.S. PATENT DOCUMENTS 5,664,186 A * 9/1997 Bennett et al. ............ 365/620
6,119,131 A * 9/2000 Cabrera ..................... 707/203
6,237,008 B1 * 5/2001 Beal et al. .................. 707/204
6,338,123 B2 * 1/2002 Joseph et al. .............. 711/144
6,366,988 B1 * 4/2002 Skiba et al. ................ 711/165
6,374,268 B1 * 4/2002 Testardi ..................... 707/205
6,490,594 B1   12/2002 Lomet

* cited by examiner

Primary Examiner—Kimberly McLean-Mayo
(74) Attorney, Agent, or Firm—John R. Ley, LLC

(57) ABSTRACT

An improved shadow directory technique allocates storage space for directories in pairs in a logical volume. One of the spaces in each pair is used for a directory for locating data in the logical volume. The other space is reserved for an updated copy (shadow) of the directory if the directory is ever to be changed or updated. After the shadow directory is stored, it becomes a new directory for locating the data in place of the previous directory. The storage space containing the previous directory is unused, but retained as allocated for the next shadow directory, if needed. Since directory storage spaces are not deallocated, the improved shadow directory technique enables a simplified sequential-allocation storage management in a primarily data-add environment.

9 Claims, 7 Drawing Sheets

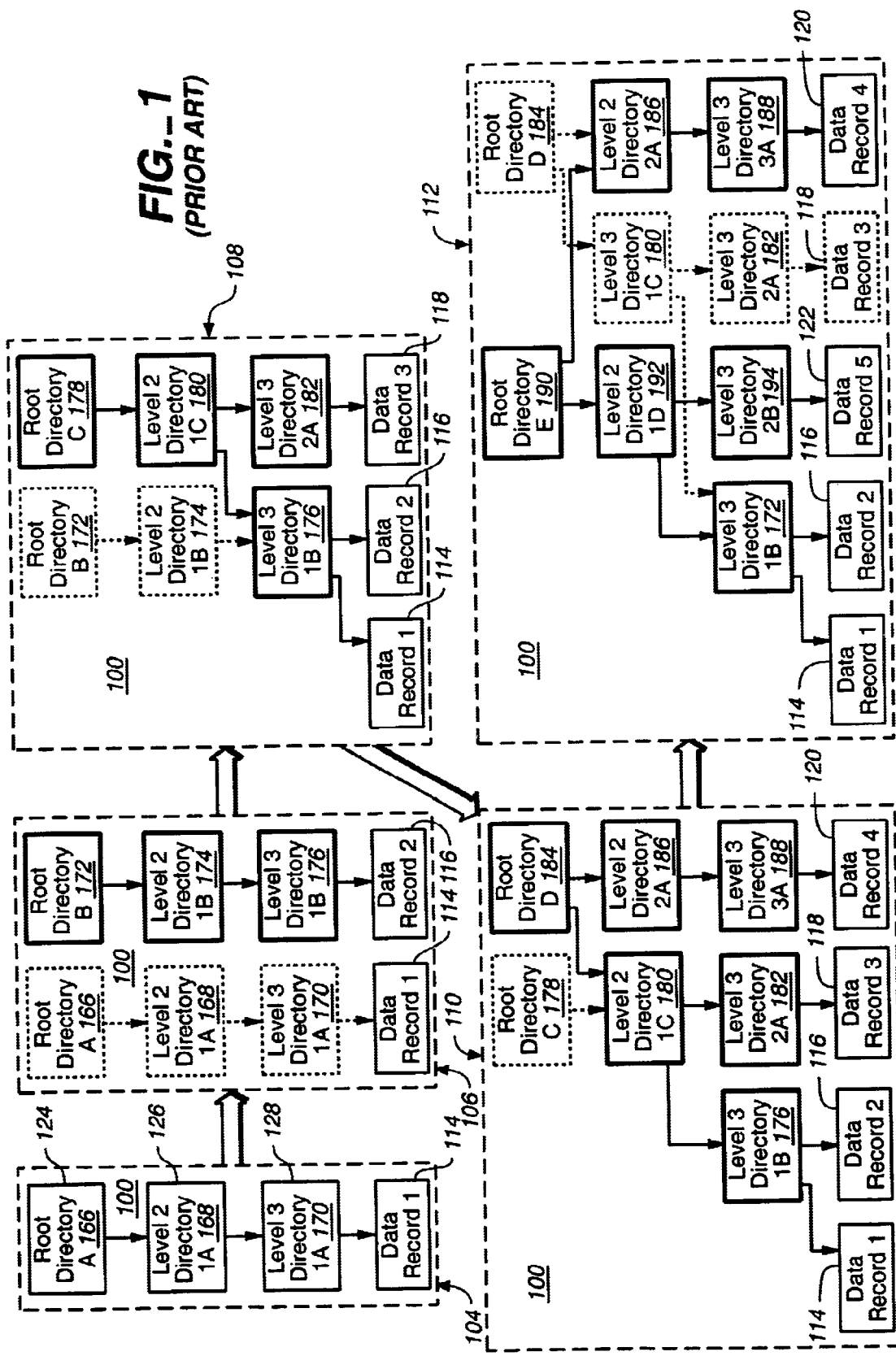
FIG._1 (PRIOR ART)

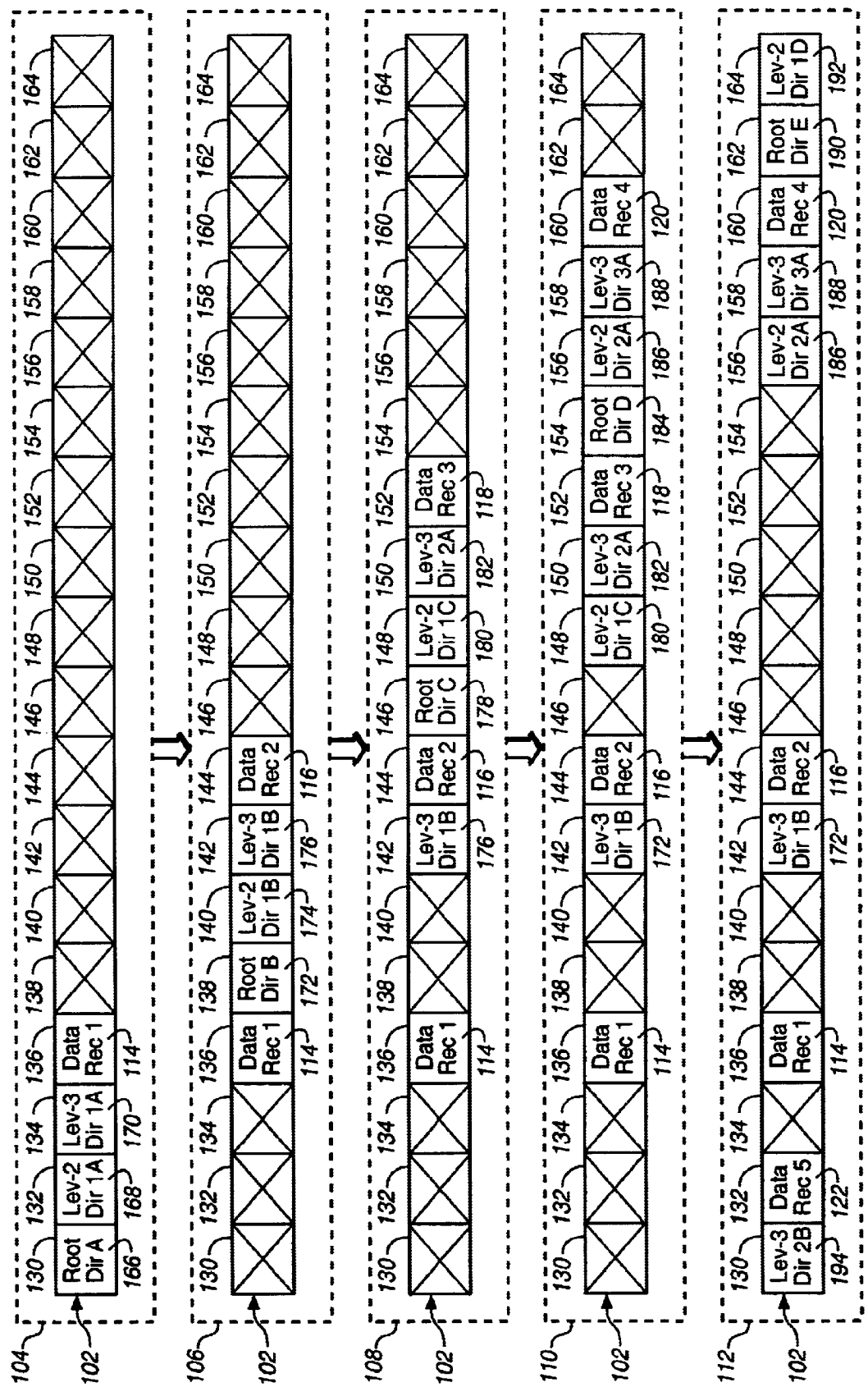
FIG._2 (PRIOR ART)

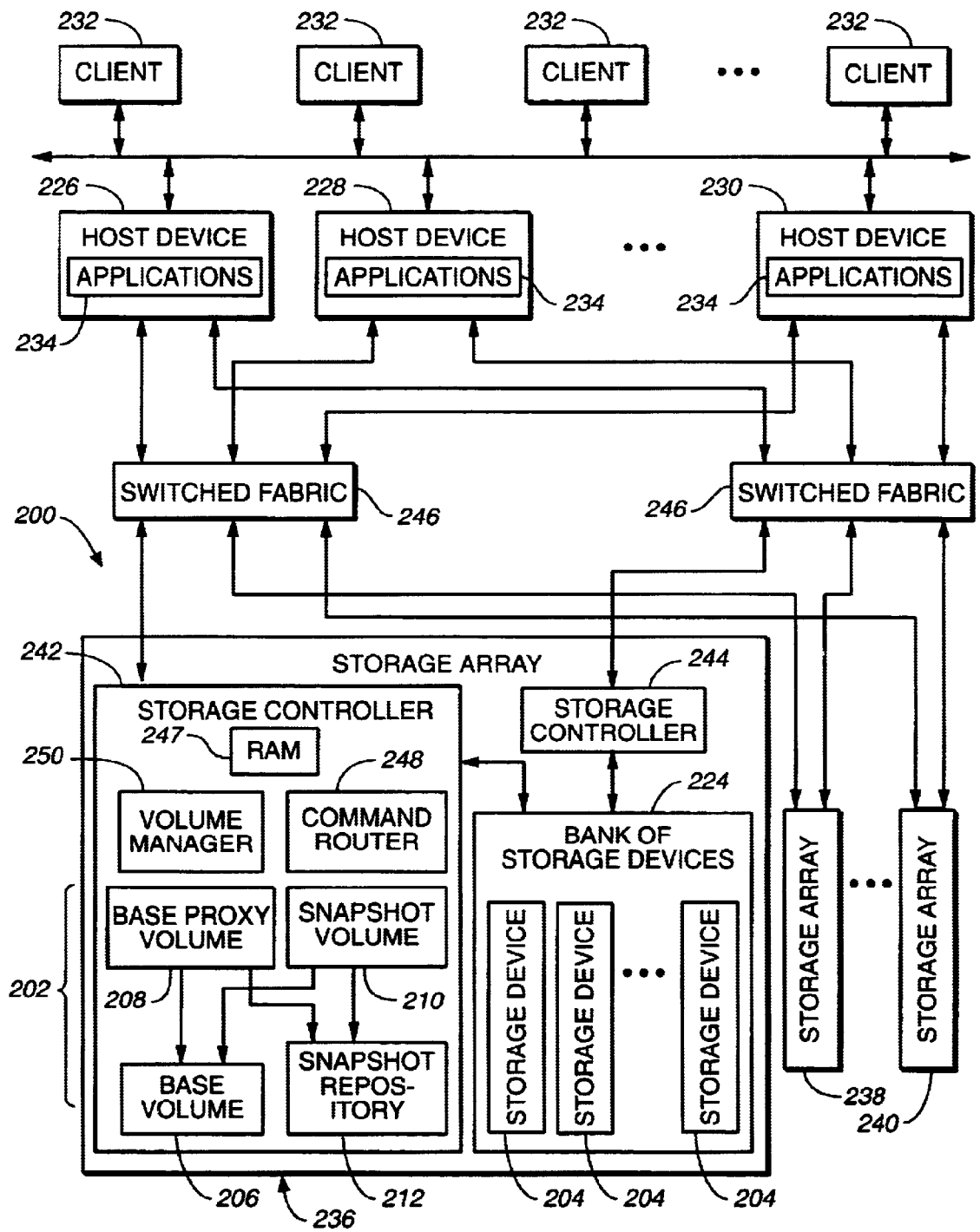
FIG._3

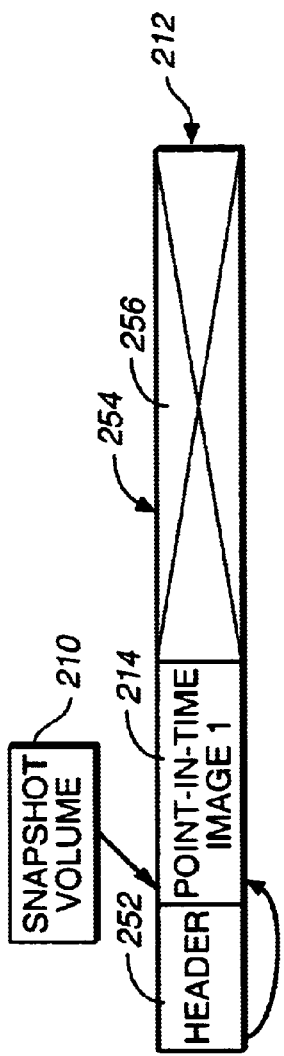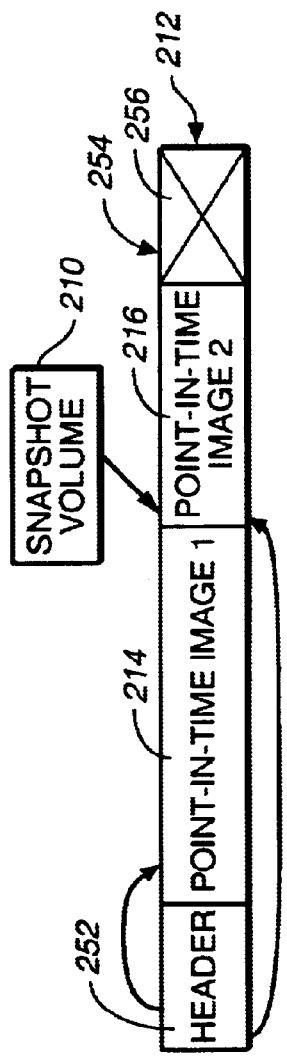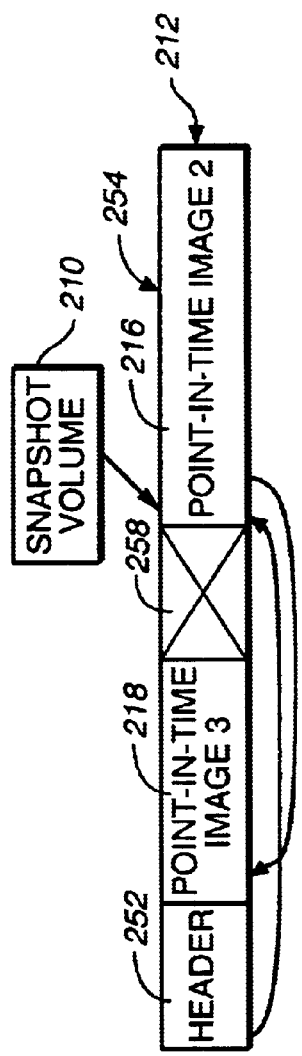

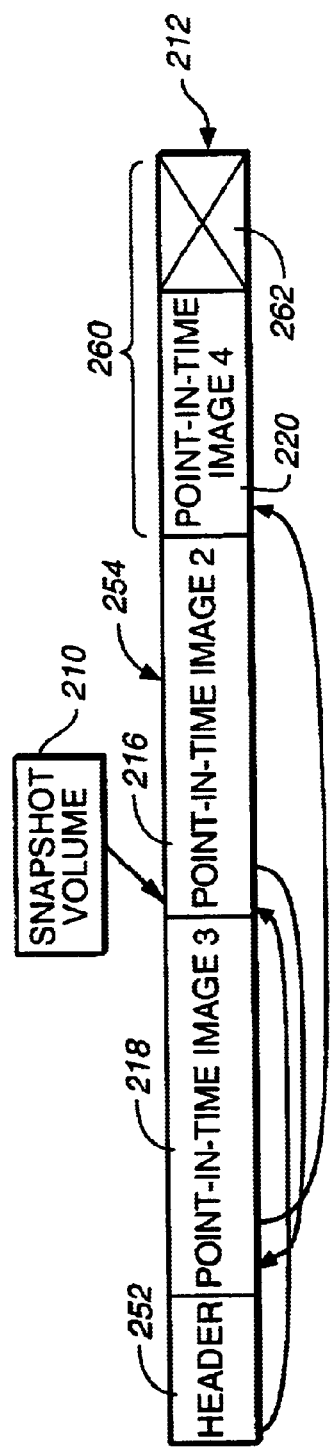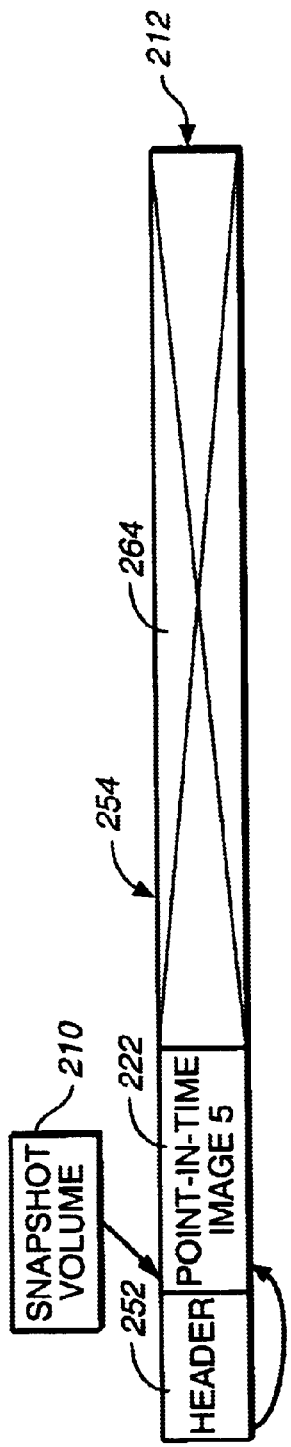

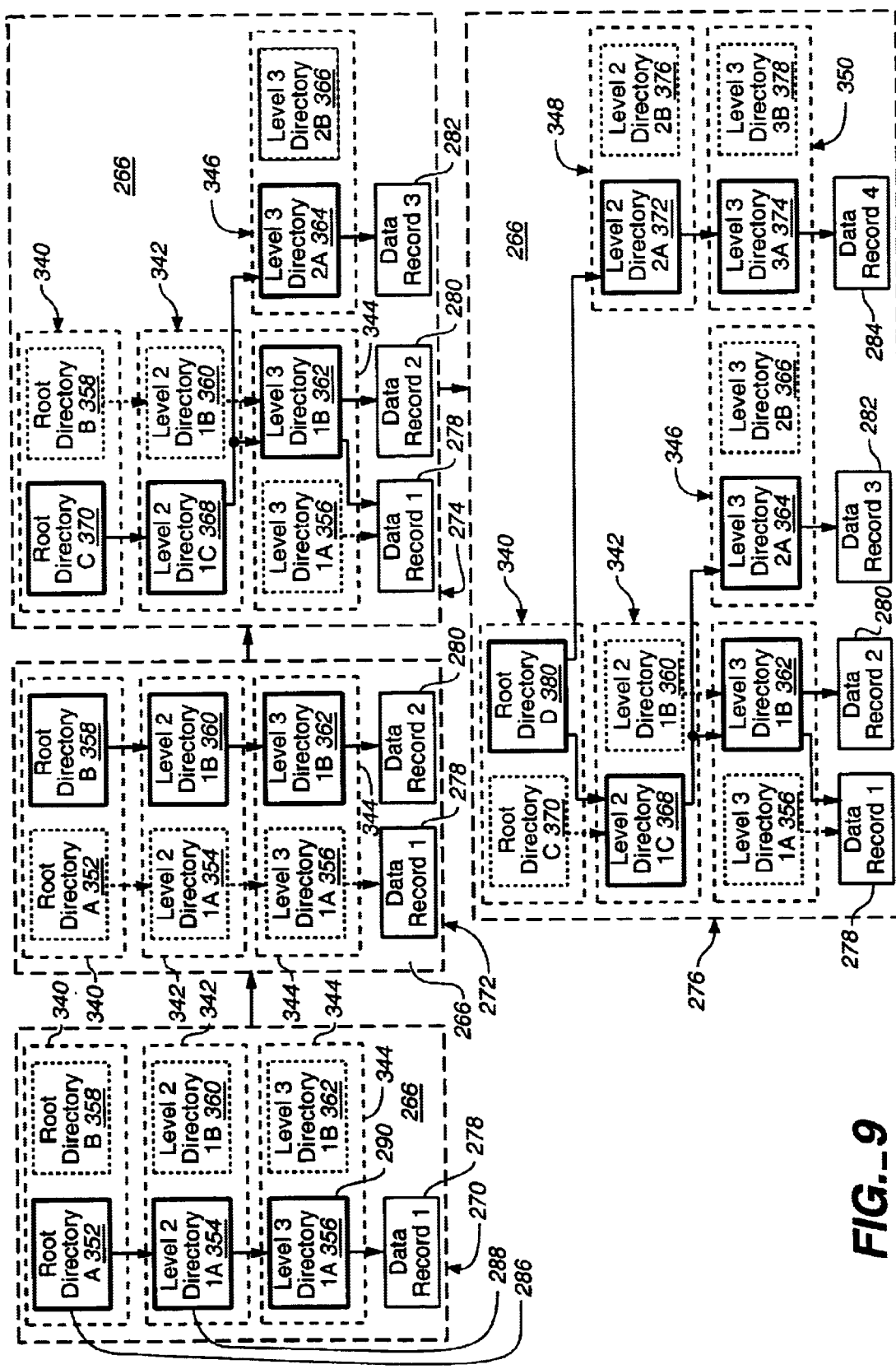
FIG._9

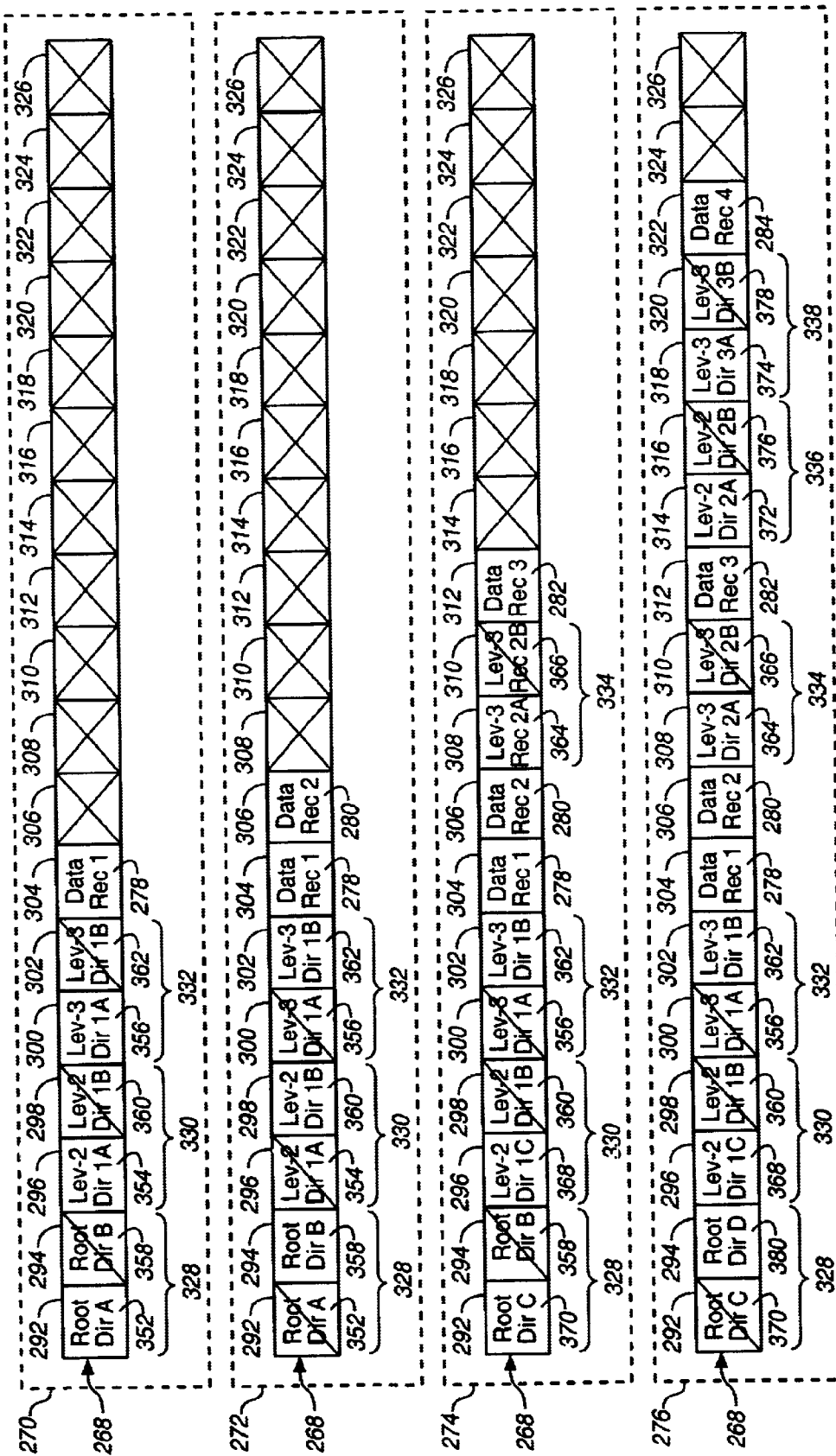

ALTERNATING SHADOW DIRECTORIES IN PAIRS OF STORAGE SPACES FOR DATA STORAGE

CROSS-REFERENCE TO RELATED APPLICATION

This invention is related to an invention for Managing a Snapshot Volume or One or More Checkpoint Volumes with Multiple Point-In-Time images in a Single Repository, described in U.S. patent application Ser. No. 091,735,175, filed Dec. 11, 2000, and assigned to the same assignee. The disclosure of this patent application is incorporated herein by this reference.

FIELD OF THE INVENTION

This invention relates to data storage in a computerized storage unit, such as a storage array in a storage area network (SAN). More particularly, the present invention relates to improved management of stored data in the storage unit using alternating "shadow" directories for updating directories in a logical volume in which data accesses are performed primarily to add records to the database.

BACKGROUND OF THE INVENTION

Current computerized data storage systems typically contain data within logical volumes formed on one or more storage device or array of storage devices. For a logical volume, storage management software typically allocates and manages an amount of storage space that "logically" appears to be a single "volume," file or database, but physically may be several files or "sub" volumes distributed across several storage devices and/or arrays of storage devices.

In addition to the data, the logical volumes also typically contain directories for the data. Typically, a directory hierarchy is used with a root directory and one or more subdirectories arranged in multiple levels. Each directory in the hierarchy is typically contained in a "block" of storage space and includes pointers either to other storage blocks containing additional directories ("directory storage blocks") or to storage blocks containing the data ("data storage blocks"). Therefore, when a data storage block is accessed in the logical volume (e.g. to read data from or write data to the data storage block), it is the directories in the directory storage blocks that point to the location of the data storage block, so software can access the data storage block.

The "active" data and directories for the logical volumes with which the software is operating are typically kept in a main memory, or RAM, of the storage devices or storage arrays. Copies of the data and directories for the logical volumes are kept on the hard drives or other mass storage devices. Whenever data is needed that is not currently in the RAM, the data is copied to the RAM to be used. Periodically, the data and directories in the RAM are stored to the hard drives. Whenever a problem, such as a power failure, causes a loss of the data in the RAM, the data is copied from the hard drives to the RAM and operations resume at the point at which the data was last stored to the hard drives.

When data is added to or updated in a data storage block in the logical volume, one or more of the directories in the logical volume must be updated and/or new directories must be created to include pointers to the new data storage block. Subsequently, the updated and/or new directories and the new data storage block are stored to the hard drives. There is the potential of losing some data, or data coherency, in the logical volume if the data and/or directories are being updated or stored to the hard drives at the moment that a problem (e.g. a power failure) occurs. Therefore, updates and changes are typically not made directly to the existing directory and data storage blocks on the hard drives, so the existing information will not be lost or corrupted.

One technique to prevent loss of information involves allocating new directory storage blocks for the affected directories and storing the currently active directories from the RAM to the new directory storage blocks ("shadow directories"), instead of to the existing directory storage blocks. During the storing of the directories from the RAM to the shadow directories on the hard drives, the previously existing directories on the hard drives are still considered the most recently stored directories for the purpose of restoring the data and directories in the RAM in the case of loss of data in the RAM. Therefore, if a problem results in loss of data in the RAM while the shadow directories are being stored, the previously existing most recently stored directories are used to restore the data in the RAM without loss of data coherency.

The highest level directory, or "root" directory, in the directory hierarchy is typically stored last, after the data and lower level directories have been stored to the hard drives. The new root directory includes the time at which it was stored, so the software can determine which root directory is the most recently stored root directory for the purpose of restoring the data and directories, if needed. Therefore, the act of storing the new root directory effectively "activates" the new root directory and all of the lower level directories linked thereto and the new data in a transition that takes such a short time that the likelihood of the occurrence of a problem is very low.

An exemplary directory hierarchy 100 for a logical volume 102 that is updated with a shadow directory technique is shown in FIGS. 1 and 2. In FIG. 1, the state of the directory hierarchy 100 on the hard drives (not shown) is shown in a progression through five different states 104, 106, 108, 110 and 112 as the logical volume 102 (FIG. 2) is stored from the RAM (not shown) to the hard drives each time that a data record 114, 116, 118, 120 and 122 is added to the logical volume 102. The data hierarchy 100 is shown as having three directory levels 124, 126 and 128. The logical volume 102 is shown as having 18 storage blocks 130–164 for directories or data.

The data record 114 is the first data record to be written to the logical volume 102 (FIG. 2), resulting in the creation of initial root and level 2 and 3 directories 166, 168 and 170 in the directory hierarchy 100 (see state 104). The directories 166, 168 and 170 and the data record 114 are stored from the RAM (not shown) to the hard drives (not shown) without shadow directories, since these directories 166, 168 and 170 are the initial directories. For states 106–110, the data records 116, 118 and 120 are added to the logical volume 102 at different levels in the directory hierarchy 100. The state 112 results from replacing one of the previously added data records (data record 118) with data record 122 and "wrapping around" data storage from the last storage block 164 to the first available storage block 130.

For each of the states 106–112 that follow the initial state 104, one or more of the current directories on the RAM (not shown), including the current root directory, are stored from the RAM to shadow directories on the hard drives (not shown), so the updates due to each added data record 116–122 can occur to the shadow directories, while the previously existing directories are still considered the most recently stored directories on the hard drives. Additionally, in some cases, new directories are added to the logical volume 102 (FIG. 2).

For example, for state 106, the data record 116 is added to the logical volume 102 (FIG. 2) at the level 3 directory 170 in the RAM (not shown), so the initial root and level 2 and 3 directories 166, 168 and 170 are updated in the RAM. When it is time to store the initial root and level 2 and 3 directories 166, 168 and 170 to the hard drive (not shown), they are stored to shadow root and level 2 and 3 directories 172, 174 and 176, respectively, on the hard drive. Additionally, the data record 116 is added to the logical volume 102 on the hard drive. The shadow level 3 directory 176 includes a pointer to the data record 116. The shadow level 2 directory 174 includes a pointer to the shadow level 3 directory 176, and the shadow root directory 172 includes a pointer to the shadow level 2 directory 174.

After the updated root directory is stored from the RAM (not shown) to the shadow root directory 172 on the hard drive (not shown), the shadow root directory 172 becomes the current most recently stored root directory, effectively "activating" the level 2 and 3 directories 174 and 176 and "removing" the initial root and level 2 and 3 directories 166, 168 and 170 from the directory hierarchy 100.

For state 108, the data record 118 is added to the logical volume 102 (FIG. 2) at the level 2 directory 174 in the RAM (not shown). Thus, the root and level 2 directories 172 and 174 are updated in the RAM and a new level 3 directory 182 is added to the directory hierarchy 100 in the RAM. Upon storing the updated root and level 2 directories 172 and 174 and the new level 3 directory 182 from the RAM to the hard drives (not shown), the root and level 2 directories 172 and 174 are stored to shadow root and level 2 directories 178 and 180, respectively. The data record 118 is also added to the logical volume 102 on the hard drives. After the updated root directory 172 is stored from the RAM to the shadow root directory 178 on the hard drives, the shadow root directory 178 becomes the currently active root directory, effectively activating the level 2 and 3 directories 180 and 182 and removing the previous root and level 2 directories 172 and 174 from the directory hierarchy 100.

For state 110, the data record 120 is added to the logical volume 102 (FIG. 2) at the root directory 180 in the RAM (not shown). Thus, the root directory 178 is updated in the RAM and new level 2 and 3 directories 186 and 188 are added to the directory hierarchy 100 in the RAM. Upon storing the updated root directory 178 and new level 2 and 3 directories 186 and 188 from the RAM to the hard drives (not shown), the root directory 178 is stored to shadow root directory 184. After the shadow root directory 184 has been stored to the hard drives, the shadow root directory 184 becomes the currently active root directory, effectively activating the new level 2 and 3 directories 186 and 188 and removing the previous root directory 178 from the directory hierarchy 100.

For state 112, the data record 122 replaces the data record 118, so the root directory 184 and level 2 and 3 directories 180 and 182 are updated in the RAM (not shown). When it is time to store the updated root directory 184 and level 2 and 3 directories 180 and 182 from the RAM to the hard drives (not shown), the root directory 184 and level 2 and 3 directories 180 and 182 are stored to shadow root and level 2 and 3 directories 190, 192 and 194, respectively, on the hard drives. After the shadow root directory 190 has been stored, the shadow root directory 190 becomes the currently active root directory, activating the level 2 and 3 directories 192 and 194 and removing the previous root directory 184, level 2 and 3 directories 180 and 182 and the data record 118.

Referring to FIG. 2, at state 104, the first four storage blocks 130–136 of the logical volume 102 have been filled with the initial root and level 2 and 3 directories 166–170 and the data record 114, respectively. At each succeeding state 106–112 the added data and the shadow and new directories are typically created in the next available storage blocks 130–164, and the storage blocks 130–164 previously occupied by directories or data that have been replaced or removed are freed up as available storage blocks in the logical volume 102 on the hard drives (not shown). Additionally, when the last storage block (e.g. 164) has been filled, data storage and directory creation typically "wrap around" to the first available freed-up storage block 130 in the logical volume 102.

The net result of the additions and deletions of the directories and data records is that the logical volume 102 at state 112 on the hard drives (not shown) has several available storage blocks 134, 138, 140 and 146–154 that are not all contiguous. Storage management techniques, to be able to handle such noncontiguous storage blocks, must keep track of the storage blocks on a block-by-block basis, which can be complicated for large storage systems and which require considerable storage space to contain the information and a lot of processing time to perform the techniques.

It is with respect to these and other background considerations that the present invention has evolved.

SUMMARY OF THE INVENTION

An improvement of the present invention is that storage management is simplified in a storage system for which data accesses to a logical volume are primarily for adding data to the logical volume. The aforementioned patent application includes an example of such a storage system for which data accesses to the logical volume (e.g. the snapshot and checkpoint volumes and the point-in-time images described therein) are primarily for adding data to the logical volume. Since the data accesses primarily add data, the data storage blocks in the logical volume rarely, if ever, have to be changed, so the storage management issues regarding noncontiguous storage blocks, resulting from the "freeing up" of storage blocks as described in the background, do not occur for the data storage blocks. Additionally, the present invention includes an improved shadow directory technique that does not result in freeing up noncontiguous directory storage blocks on the storage devices (e.g. hard drives, etc.). Therefore, the storage management complexities required for handling noncontiguous storage blocks (data or directory storage blocks), which resulted from the prior art shadow directory techniques, are eliminated in the present invention. In other words, the improved shadow directory technique enables a simplified, more efficient and faster storage management, which uses less storage space and processing time in a "primarily data-add environment."

The improved shadow directory technique involves alternating shadow directories between two established directory storage blocks for each directory in the logical volume. Directory storage blocks for every directory are established, or allocated, in pairs, preferably contiguous, and neither directory storage block is ever freed up. Instead, the shadow directory for a current most recently stored directory contained in one of the paired directory storage blocks is always preferably formed in the other one of the paired directory storage blocks. After the data is written and the shadow directories are updated and stored to the storage devices, the shadow directories become the current most recently stored directories. In each pair of directory storage blocks, the directory storage block for the previous, or outdated, directory is maintained as allocated for the directory and reused for the next shadow directory, so there are no resulting freed-up noncontiguous storage spaces.

Since the directory storage blocks and the data storage blocks are never freed up, the storage blocks in the storage device are always preferably allocated sequentially from the first storage block of the logical volume to the last. In other words, the next contiguous storage block after the most recently allocated storage block is always the next storage block to be allocated for a directory or for data in the logical volume on the storage device. Therefore, in order to locate an available storage block to be allocated, the storage management software has to keep track of only the next available storage block instead of all available storage blocks, since all previous storage blocks are known to be allocated and all subsequent storage blocks are known to be available.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of several states of a prior art directory hierarchy as it is updated with a prior art shadow directory technique.

FIG. 2 is a block diagram of several states of a prior art logical volume corresponding to the states of the prior art directory hierarchy shown in FIG. 1.

FIG. 3 is a block diagram of a data storage system incorporating the present invention.

FIGS. 4, 5, 6, 7 and 8 are block diagrams of multiple logical volumes for which data accesses primarily add data in the data storage system shown in FIG. 3.

FIG. 9 is a block diagram of several states of a directory hierarchy for one of the logical volumes shown in FIGS. 4–8 as it is updated with a shadow directory technique according to the present invention.

FIG. 10 is a block diagram of several states of the logical volume that incorporates the directory hierarchy shown in FIG. 9. The states of the logical volume correspond to the states of the directory hierarchy shown in FIG. 9.

DETAILED DESCRIPTION

A data storage system 200, as shown in FIG. 3, such as a storage area network (SAN), stores and retrieves data in logical volumes 202 that are contained in one or more conventional storage devices 204 (e.g. hard drives, tape drives, etc.). The aforementioned patent application describes such a data storage system. Generally, the logical volumes 202 include a base volume 206, a base proxy volume 208, a snapshot volume 210 and a snapshot repository 212. The base volume 206 is typically the primary volume for storing the data in the data storage system 200. Thus, the data stored in the base volume 206 is frequently added, deleted and modified as needed. The base proxy volume 208, the snapshot volume 210 and the snapshot repository 212 are used when "snapshots" or "checkpoints" are formed from the base volume 206, as described in the aforementioned patent application.

The snapshot repository 212 generally includes copies of the data in the base volume 206 in one or more point-in-time images 214, 216, 218, 220 and 222 (see FIGS. 4–8, below). With certain exceptions described in the aforementioned patent application, the data copied from the base volume 206 to the point-in-time images 214–222 is typically written once into the snapshot repository 212 and seldom, if ever, changed until the snapshot repository 212 is no longer needed and can be deleted as a whole. Occasionally, one or more of the point-in-time images 214–222 is deleted after the data therein is used or no longer needed. However, the point-in-time images 214–222 typically exemplify logical volumes for which data is primarily added thereto and seldom, if ever, changed or deleted.

An improved shadow directory technique described below can be used to manage any type of logical volume, but certain advantages, described below, of the improved shadow directory technique are fully realized in a "primarily data-add environment." Therefore, the below described improved shadow directory technique is preferably used to manage the data and directories contained in the point-in-time images 214–222 (FIGS. 4–8) in the data storage system 200.

Generally, the data storage system 200 also includes conventional banks 224 of the storage devices 204 that are accessed by one or more conventional host devices 226, 228 and 230 typically on behalf of one or more conventional client devices 232 or applications 234 running on the host devices 226–230. The storage devices 204 in the storage banks 224 are preferably incorporated in conventional high-volume, high-bandwidth storage arrays 236, 238 and 240. Storage space in the storage devices 204 within the storage arrays 236–240 is configured into the logical volumes 202. The host devices 226–230 utilize the logical volumes 202 to store data for the applications 234 or the client devices 232. The host devices 226–230 issue data access requests, on behalf of the client devices 232 or applications 234, to the storage arrays 236–240 for access to the logical volumes 202.

The storage arrays 236–240 typically have more than one conventional multi-host channel RAID storage controller (a.k.a. array controller) 242 and 244, as shown in storage array 236. The array controllers 242 and 244 work in concert to manage the storage array 236, to create the logical volumes 202 and to handle the data access requests to the logical volumes 202 that are received by the storage array 236. The array controllers 242 and 244 connect to the storage devices 204 to send and receive data to and from the logical volumes 202. The array controllers 242 and 244 send and receive data, data access requests, message packets and other communication information to and from the host devices 226–230 through conventional interface ports (not shown) connected to conventional switched fabrics 246. The host devices 226–230 send and receive the communication information through conventional host bus adapters (not shown) connected to the switched fabrics 246. The array controllers 242 and 244 also include a conventional main memory, or RAM, 247 on which the logical volumes 202 and other software reside while operating or being operated upon.

The logical volumes 202 are shown in the storage controllers 242 and 244, since it is within the storage controllers 242 and 244, while resident in the RAM 247, that the logical volumes 202 perform their functions and are managed. The storage devices 204 provide the actual mass storage space for the logical volumes 202.

The base volume 206 typically stores the data that is currently being utilized by the client devices 232 or applications 234. If no snapshot volume 210 has yet been created for the base volume 206, then the base volume 206 is the only logical volume 202 present. The snapshot volume 210 is created when it is desired to preserve the state of the base volume 206 at a particular point in time. Other snapshot volumes may subsequently be created when it is desired to preserve the state of the base volume 206 or of the snapshot volume 210 at another point in time.

The snapshot volumes 210 include checkpoint volumes, which are special-case, or limited-purpose, snapshot volumes to which data typically cannot be written beyond copying the data storage blocks from the base volume 206. Thus, the checkpoint volumes are usually strict "data-add environments."

When the snapshot volume 210 is created, the base proxy volume 208 and the snapshot repository 212 corresponding to the snapshot volume 210 are also created. The snapshot repository 212 contains copies of data storage blocks (not shown) from the corresponding base volume 206. The snapshot repository 212 also contains software code for performing certain functions, such as searching for data storage blocks within the snapshot repository 212 and saving data storage blocks to the snapshot repository 212.

The snapshot volume 210 represents the state of the data in the corresponding base volume 206 at the point in time when the snapshot volume 210 was created. A data access request that is directed to the snapshot volume 210 will be satisfied by data either in the snapshot repository 212 or in the base volume 206. Thus, the snapshot volume 210 does not contain any of the data. Rather, the snapshot volume 210 includes identifiers for the corresponding base volume 206, snapshot repository 212 and the point-in-time images 214–222 (FIGS. 4–8) within the snapshot repository 212. The snapshot volume 210 also includes software code for performing certain functions, such as data read and write functions, on the corresponding base volume 206 and snapshot repository 212. Additionally, it is possible to reconstruct, or rollback, the corresponding base volume 206 to the state at the point in time when the snapshot volume 210 was created by copying the data storage blocks in the corresponding snapshot repository 212 back to the base volume 206 by issuing a data read request to the snapshot volume 210.

The base proxy volume 208 intercepts the data access requests directed to the base volume 206 transparent to the host devices 226–230. The base proxy volume 208 includes software code for performing certain functions, such as data read and write functions and copy-on-write functions, on the corresponding base volume 206 and snapshot repository 212. Thus, the base proxy volume 208 does not contain any of the data, but includes identifiers for the corresponding base volume 206 and snapshot repository 212.

A command router 248 (a software program resident in the RAM 247) executes on each of the storage controllers 242 and 244 to receive and process data access commands directed to the base volume 206 and the snapshot volume 210. Thus, the command router 248 includes identifiers for the base proxy volume 208 (or the base volume 206 if there are no base proxy volumes 208 or the topmost base proxy volume 208 if there are multiple base proxy volumes 208 in a hierarchy of base proxy volumes 208) and the snapshot volumes 210.

Additionally, a volume manager 250 (a software program resident in the RAM 247) executes on each of the storage controllers 242 and 244 to manage the creation, deletion and modification of the snapshot volumes 210, the base proxy volumes 208, the snapshot repositories 212 and point-in-time images 214–222 (FIGS. 4–8) within the snapshot repositories 212. Thus, the volume manager 250 creates all of the desired snapshot volumes 210 from the base volume 206 or any previously created snapshot volume 210, typically in response to commands from the host devices 226–230 or one of the client devices 232 under control of a system administrator (not shown). The volume manager 250 also configures the command router 248 with the identifiers for the topmost base proxy volume 208 and the snapshot volumes 210 and configures the base proxy volumes 208 and the snapshot volumes 210 with the identifiers for the corresponding base volumes 206, snapshot repositories 212 and point-in-time images 214–222 within the snapshot repositories 212.

A technique for storing the data for the snapshot volume 210 in the snapshot repository 212 using the multiple point-in-time images 214–222 is illustrated in FIGS. 4–8. The snapshot repository 212 includes a header section 252 and a data section 254 as shown in FIGS. 4–8. The data section 254 includes one or more of the point-in-time images 214 (FIGS. 4 and 5), 216 (FIGS. 5–7), 218 (FIGS. 6 and 7), 220 (FIG. 7) and 222 (FIG. 8). The point-in-time images 214–222 include storage blocks, or storage spaces, that contain data and directories. (See FIGS. 9 and 10 below).

The volume manager 250 (FIG. 3) creates the snapshot volume 210 and the snapshot repository 212 in storage spaces within the RAM 247 and the storage devices 204 (FIG. 3) and creates the initial point-in-time image 214 within the data section 254 as shown in FIG. 4. Information in the header section 252 points to the start of the point-in-time image 214. As data is written to the snapshot repository 212, the point-in-time image 214 grows into the unused portion 256 of the data section 254. After the data is written to the snapshot repository 212, it is typically not later deleted or modified, so the snapshot repository 212 is a primarily data-add environment.

At some point, the volume manager 250 (FIG. 3) may have to stop adding data to the point-in-time image 214 while still adding data to the snapshot repository 212 for the snapshot volume 210 as shown in FIG. 5. For example, the host device 226, 228 or 230 (FIG. 3) may determine that it is necessary to return the base volume 206 (FIG. 3) to the state at the time at which the snapshot volume 210 was formed. The procedure to return the base volume 206 to a previous state is called a "rollback" procedure. In this case, the volume manager 250 must stop adding data to the point-in-time image 214, so the point-in-time image 214 can be used to return the affected data storage blocks (not shown) to the base volume 206. Additionally, unless the volume manager 250 is also instructed to stop adding data to the snapshot volume 210, a second point-in-time image 216 is created at the time the rollback procedure begins, preferably starting immediately after the stop point for the first point-in-time image 214. The information in the header section 252, thus, points to the start of the first point-in-time image 214 as the start of the data used for the rollback procedure and points to the start of the second point-in-time image 216 as the start of the data for the snapshot volume 210.

Since the data in the first point-in-time image 214 is being returned to the base volume 206, it is not necessary to keep the data in the snapshot repository 212 as well. Therefore, the first point-in-time image 214 will be deleted from the snapshot repository 212 after the rollback procedure has completed. The information in the snapshot volume 210, therefore, is updated with an identifier for the second point-in-time image 216, thereby linking the snapshot volume 210 with the second point-in-time image 216. As data is added to the second point-in-time image 216, the second point-in-time image 216 grows into the remaining unused portion 256 of the snapshot repository 212.

Since the point-in-time images 214–222 in the snapshot repository 212 can be deleted, the snapshot repository 212 is not a primarily data-add environment. However, management of a few point-in-time images (potentially only one point-in-time image) within the snapshot repository 212, as described in the aforementioned patent application, is simpler than management of a large number of the individual storage blocks. Also, since the point-in-time images are primarily data-add environments, the improved shadow directory technique described below, in combination with the simplified management of the few point-in-time images, enables a simpler overall management of the storage space in the snapshot repository 212.

After the rollback procedure has completed and the first point-in-time image 214 has been deleted, as shown in FIG. 6, the data access requests to the base volume 206 (FIG. 3) and the snapshot volume 210 continue, so the second point-in-time image 216 eventually grows to the end of the extent of the snapshot repository 212. Since the portion of the snapshot repository previously occupied by the first point-in-time image 214 is now an unused portion 258, additional data may now be written starting at the beginning of the data section 254. However, since it is preferable to allocate each storage block in the point-in-time images 214–222 only to the next sequentially contiguous storage block, the second point-in-time image 216 must stop at the end of the extent of the snapshot repository 212, so the third point-in-time image 218 may start at the beginning of the data section 254. The information in the header section 252, thus, points to the start of the second point-in-time image 216 as the start of the data for the snapshot volume 210, and information in the second point-in-time image 216 points to the start of the third point-in-time image 218 as the continuation of the data for the snapshot volume 210. The snapshot volume 210 is still linked to the second point-in-time image 216, and is now indirectly linked to the third point-in-time image 218.

When the third point-in-time image 218 grows to completely fill the unused portion 258 (FIG. 6) of the snapshot repository 212, as shown in FIG. 7, the snapshot repository 212 will be completely filled and the snapshot volume 210 will have to be stopped, unless the volume manager 250 (FIG. 3) expands the extent of the snapshot repository 212 with additional space 260 at the end of the previous extent of the snapshot repository 212. With the additional space 260, the snapshot volume 210 can be continued. Again however, since it is preferable to allocate each storage block in the point-in-time images 214–222 only to the next sequentially contiguous storage block, the third point-in-time image 218 must be stopped at the end of the unused portion 258 (FIG. 6), so the fourth point-in-time image 220 can be started in the additional space 260 to grow into the unused portion 262. Thus, the information in the header section 252 still points to the start of the second point-in-time image 216 as the start of the snapshot volume 210, the information in the second point-in-time image 216 still, points to the start of the third point-in-time image 218, and information in the third point-in-time image 218 points to the start of the fourth point-in-time image 220 as the continuation of the data for the snapshot volume 210.

At some point, the host device 226, 228 or 230 (FIG. 3) may instruct the volume manager 250 (FIG. 3) to stop and restart the snapshot volume 210, as shown in FIG. 8. In this case, all of the existing point-in-time images 216, 218 and 220 are deleted and the fifth point-in-time image 222 is begun at the start of the data section 254 of the snapshot repository 212. Thus, the information in the header section 252 points to the start of the fifth point-in-time image 222, which grows sequentially into the unused portion 264 of the data section 254. Also, the snapshot volume 210 is updated with an identifier for the fifth point-in-time image 222.

As can be seen in the examples shown in FIGS. 4–8, multiple point-in-time images 214–222, which are primarily data-add environments, are used to store the data for the snapshot volume 210 in a single snapshot repository 212. In this manner, the complicated data management record-keeping required in the prior art for keeping track of all of the individual blocks of data within the snapshot repository 212 is not required. Instead, since the point-in-time images 214–222 typically contain much more than a single data storage block, data management record-keeping has to keep track of far fewer divisions of the snapshot repository 212. Additionally, since each point-in-time image 214–222 is restricted to growing only sequentially, minimal data management record-keeping, which only has to link each sequential data storage block within the point-in-time image 214–222, is required to keep track of the individual data storage blocks.

The improved shadow directory technique is illustrated in FIGS. 9 and 10. A directory hierarchy 266 (FIG. 9) for a logical volume 268 (FIG. 10) is shown proceeding through four states 270, 272, 274 and 276 as data records 278, 280, 282 and 284 are added to the logical volume 268. The directory hierarchy 266 is shown having three directory levels 286, 288 and 290. The logical volume 268 is shown having 18 storage blocks 292–326 for directories and data.

The storage blocks 292–326 are allocated in pairs 328–338 whenever a new directory is created, in order to support active/shadow directory pairs 340–350 for each directory. Alternatively, the second storage block of each pair may not be allocated at the time that the first storage block is allocated. Instead, the second storage block may be allocated later, when it is needed. In this manner, in a situation in which one or more of the directories are never updated, the second storage block therefor will never be allocated, thereby preventing the unnecessary allocation of storage blocks that never get used. The storage blocks 292–326 of the pairs 328–338 each preferably reference the other storage block 292–326 in the pair 328–338 so that software can locate both storage blocks 292–326 of each pair 328–338 to determine which storage block 292–326 contains the most recently stored version of the directory contained therein.

State 270 is the initial state for the logical volume 268 after the logical volume 268 has been created and the first data record 278 has been written thereto. Thus, the initial active root and level two and three directories 352, 354 and 356 have been created in the first storage blocks 292, 296 and 300 (FIG. 10), respectively, of the first three storage block pairs 328, 330 and 332 (FIG. 10), respectively. The other storage blocks 294, 298 and 302 (FIG. 10) of the first three storage block pairs 328, 330 and 332, respectively, are empty and unused at this point, but are reserved for shadow root and level two and three directories 358, 360 and 362, respectively. The root directory 352 points to the level two directory 354, which points to the level three directory 356, which in turn points to the data record 278, which is written to the storage block 304 (FIG. 10). The remainder of the storage blocks 306–326 (FIG. 10) are unallocated at this time.

At state 272, the second data record 280 has been added to the logical volume 268 (FIG. 10) at the active level three directory (formerly 356, now 362) in the storage block 306 (FIG. 10). Upon adding the second data record 280 to the logical volume 268 in the RAM 247 (FIG. 3), since the second data record 280 is added at the active level three directory 356, the active level three directory 356 is updated in the RAM 247. Since the active level three directory 356 is changed, the active level two directory 354 is also updated in the RAM 247. Additionally, since the active level two directory 354 is changed, the active root directory 352 is also updated in the RAM 247.

Upon storing the second data record 280 and the updated root and level 2 and 3 directories 352, 354 and 356 from the RAM 247 (FIG. 3) to the storage devices 204 (FIG. 3), the updated level three directory 356 is stored to the shadow level three directory 362 on the storage devices 204. The updated level two directory 354 is stored to the shadow level two directory 360. Additionally, the updated root directory 352 is stored to the shadow root directory 358. The current most recently stored root and level two and three directories 352, 354 and 356 on the storage devices 204 remain available for restoring lost data during the storing of the updated root and level 2 and 3 directories 352, 354 and 356 from the RAM 247 to the shadow root and level 2 and 3 directories 358, 360 and 362 on the storage devices 204.

No additional storage blocks 306–326 on the storage devices 204 are allocated for any directories at this time. The second data record 280, however, is written to the next sequentially contiguous storage block 306.

The shadow level three directory 362 points to the second data record 280 in addition to the first data record 278. The shadow level two directory 360 points to the shadow level three directory 362 instead of the current most recently stored level three directory 356. The shadow root directory 358 points to the shadow level two directory 360 instead of the current most recently stored level two directory 354.

Upon storing the updated root directory 352 from the RAM 247 (FIG. 3) to the shadow root directory 358 on the storage devices 204 (FIG. 3), the shadow root directory 358 becomes the new current most recently stored root directory in place of the previous root directory 352. In this manner, the shadow level two and three directories 360 and 362 are effectively also activated to be the new current most recently stored level two and three directories in place of the previous level two and three directories 354 and 356. Thus, at state 272, the directory hierarchy 266 includes the root and level two and three directories 358, 360 and 362.

The storage blocks 292, 296 and 300 (FIG. 10) containing the now inactive root and level two and three directories 352, 354 and 356, respectively, are now unused, but are not freed up, or deallocated. Instead, the storage blocks 292, 296 and 300 are retained as allocated in the storage devices 204 (FIG. 3) for the next shadow directories of the root and level two and three directories 358, 360 and 362, respectively, in the RAM (FIG. 3). Therefore, under the improved shadow directory technique, none of the allocated storage blocks 292–306 (FIG. 10) are freed up, so the volume manager 250 (FIG. 3) does not have to keep track of noncontiguous available storage spaces.

At state 274, the third data record 282 has been added to the logical volume 268 (FIG. 10) at the active level two directory 360 in the storage block 312 (FIG. 10). Before the third data record 282 is added, since the third data record 282 is to be added at the active level two directory 360, a new level three directory 364 must be added to the directory hierarchy 266 in the RAM 247 (FIG. 3) between the active level two directory 360 and the third data record 282. Additionally, the active level two directory 360 in the RAM 247 is updated in order to accommodate the new level three directory 364. Since the active level two directory 360 is changed, the active root directory 358 is also updated in the RAM 247.

Upon storing the third data record 282 and the updated root and level 2 directories 358 and 360 and the new level 3 directory 364 from the RAM 247 (FIG. 3) to the storage devices 204 (FIG. 3), the next two contiguous storage blocks 308 and 310 (FIG. 10) are allocated for the active/shadow directory pair 346 for the new level 3 directory 364. The new level 3 directory 364 is then stored in the storage block 308, and the other storage block 310 is empty, but reserved for a subsequent shadow level 3 directory 366, if one is ever needed. The third data record 282 is then stored from the RAM 247 to the next sequentially contiguous storage block 312. The level two directory 360 is stored to a shadow level two directory 368 in the storage block 296 (FIG. 10) on the storage devices 204. The active root directory 358 is stored to a shadow root directory 370 in the storage block 292 (FIG. 10) in the storage devices 204.

While the updated root and level 2 directories 358 and 360 and the new level 3 directory 362 are being stored from the RAM 247 (FIG. 3) to the storage devices 204 (FIG. 3), the current most recently stored root and level two and three directories 358, 360 and 362 on the storage devices 204 remain available for accessing the first and second data records 278 and 280 in the event that data must be restored to the RAM 247. The current most recently stored level three directory 362 remains unchanged, since it will not be used to access the third data record 282.

The new level three directory 364 points to the third data record 282. The shadow level two directory 368 points to the new level three directory 364 in addition to the current most recently stored level three directory 362. The shadow root directory 370 points to the shadow level two directory 368 instead of the current most recently stored level two directory 360.

Upon storing the updated root directory 358 from the RAM 247 (FIG. 3) to the shadow root directory 370 on the storage devices 204 (FIG. 3), the shadow root directory 370 becomes the new current most recently stored root directory in place of the previous root directory 358. In this manner, the shadow level two directory 368 is effectively also activated to be a new current most recently stored level two directory in place of the previous level two directory 360 and the new level three directory 364 is effectively activated to be a new current most recently stored level three directory in addition to the level three directory 362. Thus, at state 274, the directory hierarchy 266 includes the root and level two directories 370 and 368 and the level three directories 362 and 364.

The storage blocks 294, 298 and 300 (FIG. 10), containing the inactive root and level two and three directories 358, 360 and 356, respectively, and the currently empty, but allocated, storage block 310 (FIG. 10) are unused, but are retained as allocated for the next shadow directories, if needed, of the active root and level two and three directories 370, 368, 362 and 364, respectively. Therefore, under the improved shadow directory technique, none of the allocated storage blocks 292–312 (FIG. 10) are freed up, so the volume manager 250 (FIG. 3) still does not have to keep track of noncontiguous available storage spaces.

At state 276, the fourth data record 284 has been added to the logical volume 268 (FIG. 10) at the active root directory 370 in the storage block 322 (FIG. 10). Before the fourth data record 284 is added, however, since the fourth data record 284 is to be added at the active root directory 370, new level two and three directories 372 and 374 must be added to the directory hierarchy 266 between the active root directory 370 and the fourth data record 284 in the RAM 247 (FIG. 3). Additionally, the active root directory 370 is updated in the RAM 247 in order to accommodate the new level two directory 372.

Upon storing the updated root directory 370 and the new level 2 and 3 directories 372 and 374 from the RAM 247 (FIG. 3) to the storage devices 204 (FIG. 3), the next four contiguous storage blocks 314, 316, 318 and 320 (FIG. 10) are allocated for the active/shadow directory pairs 348 and 350 for the new level two and three directories 372 and 374, respectively. The new level two and three directories 372 and 374 are stored in the storage blocks 314 and 318, respectively, and the other storage blocks 316 and 320 of the storage block pairs 336 and 338 (FIG. 10) are empty, but reserved for subsequent shadow level two and three directories 376 and 378, respectively, if ever needed. The fourth data record 284 is written to the next sequentially contiguous storage block 322. The updated root directory 370 is stored from the RAM 247 to a shadow root directory 380 in the storage block 294 (FIG. 10) in the storage device 204.

While the updated root directory 370 and the new level 2 and 3 directories 372 and 374 are being stored from the RAM 247 (FIG. 3) to the storage devices 204 (FIG. 3), the current most recently stored root and level two and three directories 370, 368, 362 and 364 on the storage devices 204 remain available for accessing the first, second and third data records 278, 280 and 282 in the event that data must be restored to the RAM 247. The current most recently stored level two and three directories 368, 362 and 364 remain unchanged, since they will not be used to access the fourth data record 284.

The new level three directory 374 points to the fourth data record 284. The new level two directory 372 points to the new level three directory 374. The shadow root directory 380 points to the new level two directory 372 in addition to the current most recently stored level two directory 368.

After the updated root directory 370 is stored from the RAM 247 (FIG. 3) to the shadow root directory 380 in the storage devices 204 (FIG. 3), the shadow root directory 380 becomes the new current most recently stored root directory in place of the previous root directory 370. In this manner, the new level two directory 372 is effectively also activated to be a new current most recently stored level two directory in addition to the level two directory 368 and the new level three directory 374 is effectively activated to be a new current most recently stored level three directory in addition to the level three directories 362 and 364. Thus, at state 276, the directory hierarchy 266 includes the root directory 380, the level two directories 368 and 372 and the level three directories 362, 364 and 374.

The storage blocks 292, 298 and 300 (FIG. 10), containing the inactive root and level two and three directories 370, 360 and 356, respectively, and the currently empty, but allocated, storage blocks 310, 316 and 320 (FIG. 10) are unused, but are retained as allocated for the next shadow directories, if needed, of the active root and level two and three directories 380, 368, 372, 362, 364 and 374. Therefore, under the improved shadow directory technique, none of the allocated storage blocks 292–322 (FIG. 10) are freed up, so the volume manager 250 (FIG. 3) still does not have to keep track of noncontiguous available storage spaces.

At the fourth state 110 (FIGS. 1 and 2) in the prior art technique, as shown in FIG. 2, after essentially the same four operations shown in FIGS. 9 and 10, six unallocated storage blocks in three noncontiguous groups (storage blocks 130–134, storage blocks 138 and 140 and storage block 146) are present. Under the improved shadow directory technique, there are six unused directory storage blocks 292, 298, 300, 310, 316 and 320, but all are still allocated. Therefore, the present invention has the advantage of enabling the improved sequential-allocation storage management functions of the volume manager 250 (FIG. 3).

If it were possible to replace or delete any of the data records 278–284 (FIGS. 9 and 10) in the logical volume 268 (FIG. 10), similar to the situation resulting in the fifth state 112 (FIGS. 1 and 2) in the prior art technique, then one of the data storage blocks 304, 306, 312 or 322 (FIG. 10) would be effectively unallocated upon removal of the data record 278, 280, 282 or 284 contained therein. The unallocated storage block 304, 306, 312 or 322 would then be unusable, since the sequential storage management functions of the volume manager 250 would not be able to reallocate the storage block 304, 306, 312 or 322. The improved shadow directory technique, however, would result in the loss of use of none of the directory storage blocks 292–302, 308, 310 and 314–320 upon changing or removing one of the data records 278–284. In a "primarily" data-add environment, furthermore, very few of the data storage blocks 304, 306, 312 and 322 would ever be replaced or deleted, so the loss of use of only a very few storage blocks 304, 306, 312 and 322 would be a small trade-off for the improved performance speed of the sequential-allocation storage management enabled by the improved shadow directory technique.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of managing computer storage in a data storage system having at least one storage device containing at least one logical volume for storing data, the logical volume including storage spaces containing the data and containing directories in a hierarchical directory structure that includes a top-level directory, and the data storage system using the directories to access the data in response to data access requests received by the data storage system, comprising the steps of:

creating the logical volume on the storage device with a plurality of the storage spaces;

for each directory in the hierarchical directory structure of the logical volume, allocating a pair of the storage spaces in the logical volume;

for each directory in the hierarchical directory structure, storing a first useable instance of the directory in the first of the storage spaces of the pair of storage spaces for the directory;

storing a first data in the logical volume;

linking the top-level directory through the hierarchical directory structure to the first data;

making the first useable instances of the directories available to respond to the data access requests;

receiving a request to add second data, in addition to the first data, to the logical volume;

determining selected ones of the directories, including the top-level directory, that are to be changed due to adding the second data;

for each directory to be changed, storing a first updated instance of the directory to a second storage space of the pair of storage spaces allocated for the directory;

retaining the first useable instances of the directories as available to use to respond to the data access requests;

storing the second data in a logical volume;

linking the first updated instance of the top-level directory through any other updated instances of the directories in the hierarchical directory structure to the second data, in addition to the first data;

switching the first updated instances of the directories to being second useable instances of the directories by switching the first updated instance of the top-level directory to being a second useable instance of the top-level directory;

making the second useable instances of the directories available to respond to the data access requests; and keeping the first storage space of each pair of storage spaces allocated for the directories, wherein said first storage space and the second storage space of said pair of storage spaces may be alternatively written.

2. A method as defined in claim 1 comprising the further step of:

allocating the storage spaces sequentially from a first storage space to a last storage space in the logical volume.

3. A method as defined in claim 1 comprising the further step of:

allocating each storage space in the pair of storage spaces for each directory in contiguous storage spaces.

4. A method for managing computer storage in a data storage system having at least one storage device containing at least one logical volume for storing data, the logical volume including storage spaces containing directories and the data, and the data storage system using the directories to access the data in response to data access requests received by the data storage system, comprising the steps of:

creating the logical volume on the storage device with a plurality of the storage spaces;

allocating a pair of first and second ones of the storage spaces in the logical volume for a directory;

storing a first usable instance of the directory in the first storage space;

making the first usable instance of the directory in the first storage space available to respond to the data access requests;

determining that the first usable instance of the directory is to be changed;

storing an updated instance of the directory to the second storage space;

retaining the first usable instance of the directory in the first storage space as available to use to respond to the data access requests while storing the updated instance of the directory;

switching the updated instance of the directory to being a second useable instance of the directory;

making the second usable instance of the directory in the second storage space available to respond to the data access requests; and keeping the first storage space allocated for the directory, wherein the first storage space and the second storage space can alternatively be written.

5. A method as defined in claim 4, wherein the aforesaid updated instance of the directory is a first updated instance of the directory, comprising the further steps of:

determining that the second useable instance of the directory in the second storage space is to be changed;

storing a second updated instance of the directory to the first storage space;

retaining the second useable instance of the directory in the second storage space as available to use to respond to the data access requests;

switching the second updated instance of the directory to being a third useable instance of the directory;

making the third useable instance of the directory in the first storage space available to respond to the data access requests; and keeping the second storage space allocated for the directory.

6. A method as defined in claim 4, wherein the logical volume includes a hierarchical directory structure of multiple levels of multiple directories contained in the storage spaces, the aforesaid directory is a first-level directory and the aforesaid pair of storage spaces is a first pair of storage spaces, comprising the further steps of:

allocating a second pair of the storage spaces in the logical volume for a second-level directory;

storing a first useable instance of the second-level directory in the second pair of the storage spaces;

storing first data in the logical volume;

linking the second-level directory to the first data;

linking the first-level directory to the second-level directory;

making the first useable instances of the first-level and second-level directories in the first and second pairs of the storage spaces available to respond to the data access requests;

receiving a request to store second data to the logical volume to be linked to the second-level directory;

storing first updated instances of the first-level and second-level directories to the first and second pairs of the storage spaces, respectively;

retaining the first useable instances of the first-level and second-level directories in the first and second pairs of the storage spaces as available to use to respond to the data access requests;

storing the second data to the logical volume;

linking the first updated instance of the second-level directory to the second data in addition to the first data;

linking the first updated instance of the first-level directory to the first updated instance of the second-level directory;

switching the first updated instance of the first-level directory to being a second useable instance of the first-level directory causing the first updated instance of the second-level directory to become a second useable instance of the second-level directory;

making the second useable instances of the first-level and second-level directories in the first and second pairs of the storage spaces available to respond to the data access requests; and keeping the entire first and second pairs of the storage spaces allocated for the first-level and second-level directories, respectively.

7. A computerized data storage system that stores and retrieves data in at least one logical volume in response to data access requests, the logical volume including one or more directories in a hierarchical directory structure, and the directories defining the location of the data within the logical volume, comprising:

at least one storage device containing the logical volume;

a controller connected to the storage device and being operative to control the storage device to respond to the data access requests and to manage the logical volume;

a plurality of storage spaces contained in the storage device and defining the logical volume, the controller being operative to allocate the storage spaces for containing the data and the directories, the storage spaces allocated for the directories being allocated in pairs;

and wherein:

the controller is operative to use the directories to locate the data;

each directory is contained in one storage space in the pair of storage spaces allocated for the directory;

the aforesaid data is the first data;

each aforesaid directory is a first useable directory;

for each pair of storage spaces for the directories, the storage space that contains the first useable directory is a currently active storage space and the other storage space is a currently inactive storage space;

the controller is further operative, when second data is added to the logical volume, to use a shadow directory technique to replace at least one of the first useable directories, wherein:

for each useable directory that is to be replaced, the controller is further operative to update a copy of the first useable directory due to the addition of the second data, to store the updated copy of the first useable directory in the currently inactive storage space in the pair of storage spaces allocated for the directory, to continue to use the first useable directory in the currently active storage space to locate the first data while the second data is being added and the updated copy of the first useable directory is being stored, to switch to using the updated copy of the first useable directory as a second useable directory for locating the first and second data after the second data has been added and the updated copy of the first useable directory has been stored, and to switch the currently inactive storage space and the currently active storage space to active and inactive, respectively; and the first storage space and the second storage space can alternatively be written.

8. A computerized storage system as defined in claim 7 wherein:

the controller is further operative to allocate the storage spaces sequentially from a first storage space to a last storage space in the logical volume.

9. A computerized storage system as defined in claim 7 wherein:

the controller is further operative to allocate each storage space in the pair of storage spaces for each directory in continuous storage spaces.

* * * * *